(12) United States Patent
Miyasako

(10) Patent No.: US 8,175,448 B2
(45) Date of Patent: *May 8, 2012

(54) IMAGING APPARATUS

(75) Inventor: Kenichi Miyasako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/155,582

(22) Filed: Jun. 8, 2011

(65) Prior Publication Data

US 2011/0234822 A1 Sep. 29, 2011

Related U.S. Application Data

(62) Division of application No. 12/641,224, filed on Dec. 17, 2009, now Pat. No. 7,983,547.

(30) Foreign Application Priority Data

Dec. 19, 2008 (JP) ................................. 2008-323644

(51) Int. Cl.
*G03B 17/00* (2006.01)
*H04N 5/228* (2006.01)
(52) U.S. Cl. ...................................... 396/55; 348/208.3
(58) Field of Classification Search .................... 396/55; 348/208.3
See application file for complete search history.

(56) References Cited

U.S. PATENT DOCUMENTS

| 6,630,950 B1 * | 10/2003 | Ohkawara et al. ........ 348/208.12 |
| 6,734,901 B1 * | 5/2004 | Kudo et al. ................ 348/208.4 |
| 6,734,902 B1 * | 5/2004 | Kawahara .................. 348/208.8 |
| 7,983,547 B2 * | 7/2011 | Miyasako ........................ 396/55 |
| 2005/0128309 A1 * | 6/2005 | Tomita et al. .............. 348/208.7 |
| 2006/0132612 A1 * | 6/2006 | Kawahara .................. 348/208.6 |

FOREIGN PATENT DOCUMENTS

EP 682449 A2 11/1995

* cited by examiner

*Primary Examiner* — Rodney Fuller
(74) *Attorney, Agent, or Firm* — Canon USA Inc. IP Division

(57) ABSTRACT

An imaging apparatus includes a shake detector to detect a shake applied to the imaging apparatus, a first calculation unit to calculate a first shake correction amount, a vector detector to detect a motion vector on an imaging surface, a first integration unit to integrate an output of the vector detector, a second calculation unit to calculate a second shake correction amount, a shake correction unit to correct an image-shake based of the first shake correction amount and the second shake correction amount; and an angle-of-view change determination unit to detect an angle-of-view changing operation of the imaging apparatus.

6 Claims, 7 Drawing Sheets

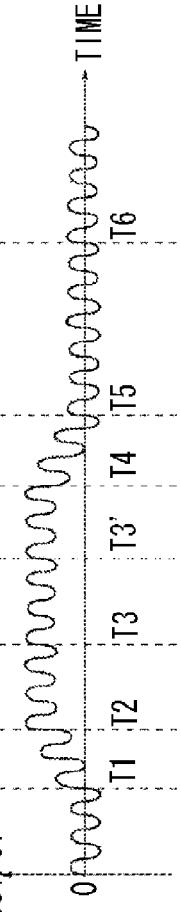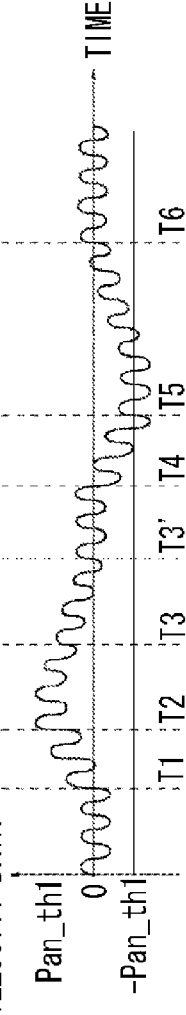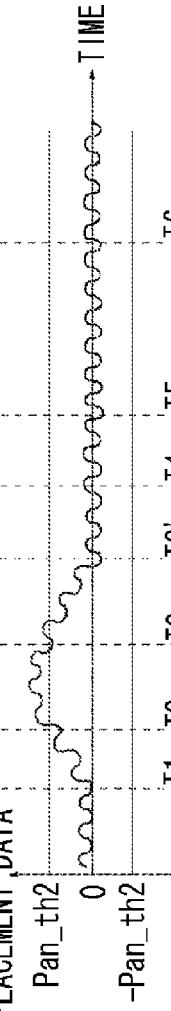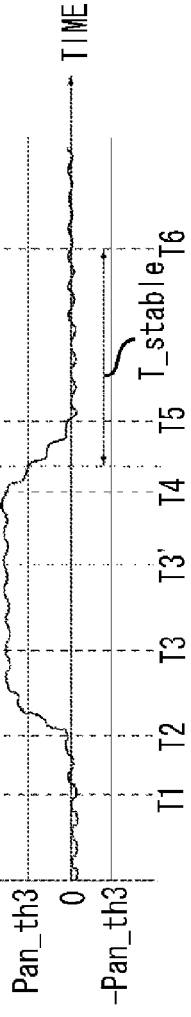

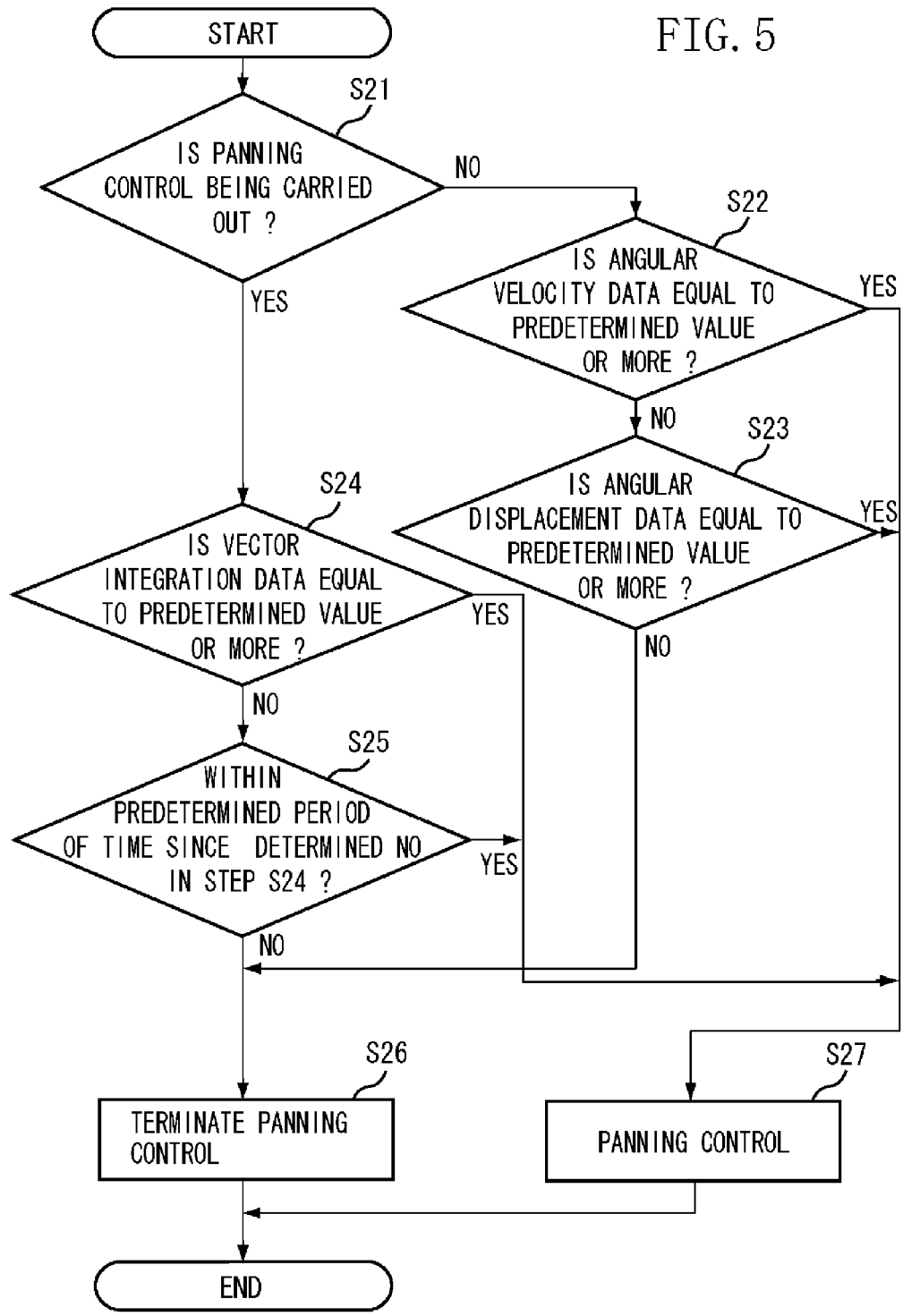

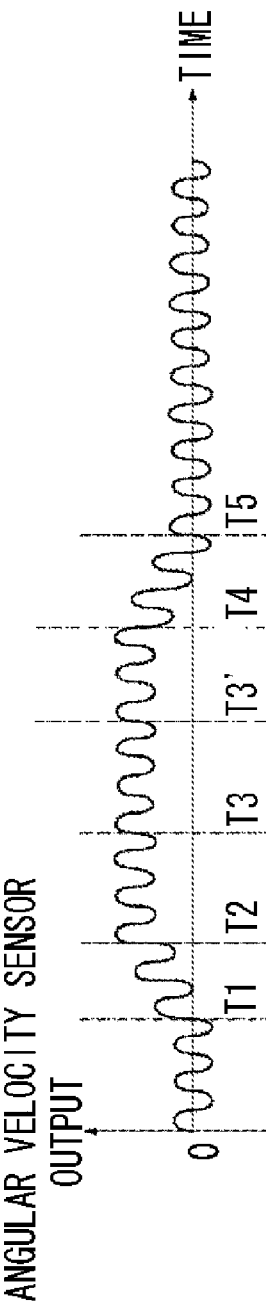
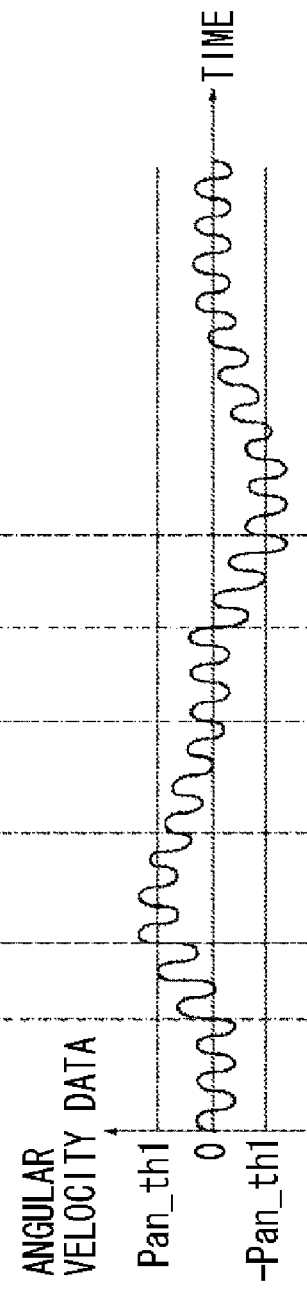
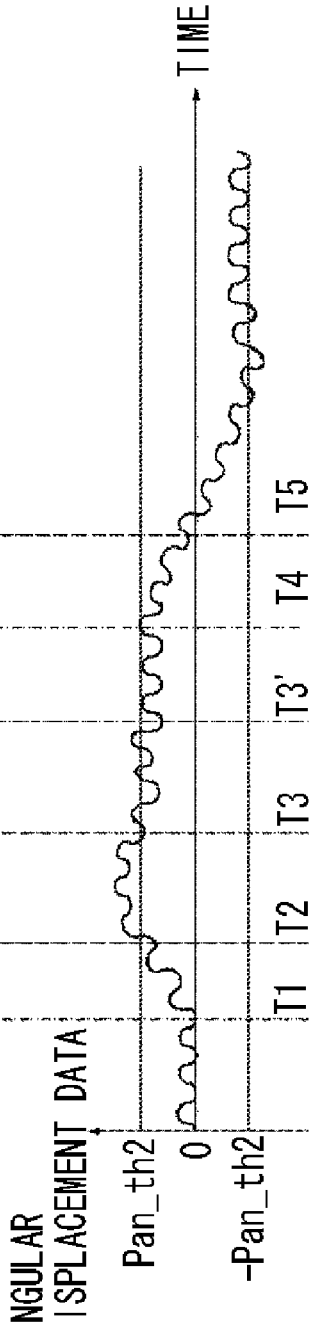
FIG. 7A
FIG. 7B
FIG. 7C

IMAGING APPARATUS

CROSS REFERENCE TO RELATED APPLICATIONS

This application is a Divisional of U.S. patent application Ser. No. 12/641,224 now U.S. Pat. No. 7,983,547 filed Dec. 17, 2009, which claims priority from Japanese Patent Application No. 2008-323644 filed Dec. 19, 2008, the entire contents of which is hereby incorporated by reference.

BACKGROUND OF THE INVENTION

1. Field of the Invention

The present invention relates to an imaging apparatus, such as a video camera, having a function of optically correcting a shake caused by a camera shake to prevent blurring of an image picked up by the imaging apparatus.

2. Description of the Related Art

In an imaging apparatus such as a video camera, automatization and multifunctionalization have been achieved in all points such as an automatic exposure (AE) and automatic focus (AF) so that good imaging can be easily performed.

In recent years, a shake applied to the imaging apparatus has been a main cause of deteriorating the quality of a picked-up image, as the imaging apparatus has been reduced in size and the magnification of an optical system has been increased. Various types of image stabilization (camera shake correction) functions for improving an image blur in the picked-up image caused by the shake applied to the imaging apparatus have been proposed. Such an image stabilization function is mounted on the imaging apparatus, so that better imaging can be easily performed.

An example of the imaging apparatus having the image stabilization function is a camera having a configuration illustrated in FIG. 6.

In an imaging apparatus 200 having an image stabilizing function, an angular velocity sensor 201 is attached to an imaging apparatus main body, and detects a shake applied to the imaging apparatus 200 as an angular velocity. A direct current (DC) cut filter 202 cuts off a DC component of an angular velocity signal output from the angular velocity sensor 201, and passes only an alternate current (AC) component, i.e., a vibration component.

An amplifier 203 amplifies the angular velocity signal that has passed through the DC cut filter 202 to have suitable sensitivity, and outputs the amplified angular velocity signal. An analog-to-digital (A/D) converter 204 digitizes the angular velocity signal output from the amplifier 203, and outputs the digitized angular velocity signal.

A central processing (CPU) unit 223, for example, functions as a high pass filter (HPF) 205, an integrator 206, a pan/tilt determination unit 222, a control filter 208, a pulse width modulation unit 209, a focal length correction unit 207, and a motion vector processing unit 221.

The HPF 205 has a function of changing cut-off frequency characteristics in any frequency band, and cuts off a low frequency component included in the digitized angular velocity signal (angular velocity data) output from the A/D converter 204, and outputs the angular velocity data. The integrator 206 has a function of changing frequency characteristics in any frequency band, and integrates the angular velocity data output from the HPF 205, and outputs the result of the integration as angular displacement data.

The focal length correction unit 207 acquires current zoom position information from a zoom encoder 217 for detecting a zoom position in an imaging optical system 213 for performing zooming and focusing operations, calculates a focal length from the information, and calculates a driving amount (gyro-based correction data) of a correction optical system 212 from information relating to the focal length and the above-mentioned angular displacement data.

In the angular velocity sensor 201 using a vibration gyro or the like, angular velocity detection properties are degraded in a low frequency of 1 Hz or less. In this low frequency band, therefore, the effect of a correction error becomes significant. As a result, an uncorrected image shake in a low frequency band cannot be corrected sufficiently, and the quality of the image is deteriorated.

The imaging apparatus 200 further includes a unit for detecting the remaining image-shake of the picked-up image in addition to detecting an angular velocity, i.e., a motion vector detection unit 220, which detects the remaining image-shake in the low frequency band and corrects the remaining image-shake, to improve correction performance as described below.

The motion vector detection unit 220 detects, from information relating to the picked-up image obtained by an image sensor 218 in the imaging apparatus 200, a motion vector of the image based on a luminance signal included in a video signal generated by a signal processing unit 219. The signal processing unit 219 generates a video signal conforming to a national television system committee (NTSC) format, for example. The motion vector processing unit 221 converts the motion vector detected by the motion vector detection unit 220 into a driving amount (vector-based correction data) of the correction optical system 212.

The vector-based correction data is a signal for correcting the remaining image-shake in the low frequency band. The vector-based correction data added to the above-mentioned gyro-based correction data becomes a final driving amount (final correction data) of the correction optical system 212 for making shake correction in the whole frequency band from the low frequency band to a high frequency band.

A difference between the final correction data and a value (position detection data) obtained by digitizing an output of a position detection sensor 214 for detecting the position of the correction optical system 212 in an A/D converter 216 is input to the control filter 208. The pulse width modulation unit 209 converts an output of the control filter 208 into a pulse width modulation (PWM) signal and outputs the PWM signal.

A motor driving unit 215 drives a motor 211 for moving the correction optical system 212 based on the PWM signal from the pulse width modulation unit 209, and changes an optical axis of light incident on an imaging surface, to optically correct an image-shake of the picked-up image.

The pan/tilt determination unit 222 determines panning/tilting based on the angular velocity data output from the A/D converter 204 and the angular displacement data output from the integrator 206, to carry out panning control. More specifically, if the angular velocity data is equal to a predetermined threshold value or more, or the angular displacement data (the result of the integration) is equal to a predetermined threshold value or more even if the angular velocity data is less than the predetermined threshold value, the pan/tilt determination unit 222 determines that the imaging apparatus 200 is in a panning state or a tilting state, to carry out panning control.

In the panning control, first the low cutoff frequency of the HPF 205 is shifted to the higher frequency side. Thus, shake correction does not respond to a low frequency. Furthermore, a time constant used for an integration operation in the integrator 206 is shifted in a direction to decrease the value thereof.

Thus, a shake correction position is gradually moved toward the center of a movement range, so that the angular displacement data output from the integrator 206 gradually comes closer to a reference value (a value that can be taken with no shake applied to the imaging apparatus 200). Furthermore, again in calculating the vector-based correction data from the detected motion vector in the motion vector processing unit 221 is shifted in a direction to decrease the value thereof.

On the other hand, unless the angular velocity data is equal to a predetermined threshold value or more, or the angular displacement data is equal to a predetermined threshold value or more even if the angular velocity data is less than the predetermined threshold value, the pan/tilt determination unit 222 determines that the imaging apparatus 200 is not in a panning state or a tilting state, to shift the low cutoff frequency of the HPF 205 to the lower frequency side, also shift the time constant used for the integration operation in the integrator 206 in a direction to increase the value thereof, and further shift the gain in calculating the vector-based correction data from the detected motion vector in the motion vector processing unit 221 in a direction to increase the value thereof.

This causes the low cutoff frequency of the HPF 205, the time constant used for the integration operation in the integrator 206, and the gain in calculating the vector-based correction data in the motion vector processing unit 221 to return to their respective original states, to cancel the panning control.

The above-mentioned control carried out by the pan/tilt determination unit 207 is discussed in Japanese Patent Application Laid-Open No. 11-187308, which is effective as shake correction control for the panning state or the tilting state because image-shake correction in a high frequency band can be performed while suppressing image-shake correction in a low frequency band. However, in the conventional image stabilizing function as in the imaging apparatus 200, however, the following problems exist.

FIG. 7A is a graph illustrating a change of an output of the angular velocity sensor 201 from the start to the end of a panning operation (angle-of-view changing operation). In FIG. 7A, the panning operation is gradually accelerated from time T1 to time T2, is performed at a predetermined speed from time T2 to time T4, and is gradually decelerated from time T4 to time T5, to end.

FIG. 7B is a graph illustrating a change of an output (angular velocity data) of the A/D converter 204 during the panning operation described above. FIG. 7C is a graph illustrating a change of an output (angular displacement data) of the integrator 206 during the panning operation described above.

The change of the angular velocity data illustrated in FIG. 7B is a change of an output of the angular velocity sensor 201 after passing through the DC cut filter 202, so that a DC component of the angular velocity data is attenuated from time T2 to time T4. A threshold value at which the transition to panning control for the angular velocity data occurs is set to Pan_th1, as illustrated in the graph of FIG. 7B. When the angular velocity data exceeds Pan_th1 from time T2 to time T3, the panning control is started.

Because of the effect of the attenuation of the DC component, it is not determined that the panning operation is being performed even during the panning operation from time T3 to time T4. T3 and T3' may be anytime between time T2 and time T4, and may change with the speed and the time of panning.

A threshold value at which the transition to panning control for the angular displacement data is set to Pan_th2, as illustrated in FIG. 7C. When the angular displacement data exceeds Pan_th2 from time T2 to time T3, it is determined that the panning operation (angle-of-view changing operation) is started, and the panning control is started.

When the panning control is started, the low cutoff frequency of the HPF 205 is shifted to the higher frequency side, and the time constant used for the integration operation in the integrator 206 is shifted in a direction to decrease the value thereof, as described above. Even if the angular velocity data is greatly shifted toward the pulse side from time T2 to time T3 illustrated in FIG. 7B, therefore, the angular displacement data is restrained from increasing, to gradually come closer to a reference value (a value that can be taken with no shake applied to the imaging apparatus 200).

As a result, the angular displacement data gradually comes closer to the reference value from time T3 to time T3'. When the angular displacement data is below Pan_th2, it is determined that the panning operation (angle-of-view changing operation) is terminated, and the panning control is canceled.

When the panning control is canceled, the low cutoff frequency of the HPF 205 is shifted to the lower frequency side, and the time constant used for the integration operation in the integrator 206 is also shifted in a direction as to increase the value thereof, as described above.

If the angular displacement data is shifted toward the pulse side, as illustrated in FIG. 7B, therefore, the angular displacement data increases to exceed Pan_th2 again, the panning control is started. From time T3 to time T3', the transition to the panning control and the cancel of the panning control are thus repeated, resulting in unnatural moving of the picked-up image.

From time T3' to time T4, the DC component of the angular velocity data is converged to zero, as illustrated in FIG. 7B. Therefore, the angular displacement data does not greatly vary, so that it is not determined that the panning operation is being performed.

From time T4 to time T5, the angular velocity data varies in the minus direction by the output of the angular velocity sensor 201 at the time when the panning operation is decelerated. At time T4, it is not determined that the panning operation is being performed, as described above. Therefore, the low cutoff frequency of the HPF 205 is set lower, and the time constant used for the integration operation in the integrator 206 is also set longer.

When the angular velocity data varies in the minus direction, therefore, its signal component is not attenuated. Therefore, the angular displacement data greatly varies in the minus direction. As a result, the picked-up image moves, although a user does not move the imaging apparatus 200, after the panning operation is terminated.

As described above, in the conventional image stabilizing function, the low frequency component during the panning operation is attenuated by the DC cut filter 202, so that the panning control is canceled even if the panning operation is being performed. Therefore, the picked-up image becomes an unnatural image.

SUMMARY OF THE INVENTION

The present invention is directed to an imaging apparatus and an imaging method for improving the precision with which panning is determined and reducing the occurrence of unnecessary movement even during and after completion of panning control.

According to an aspect of the present invention, an imaging apparatus includes a shake detector configured to detect a shake applied to the imaging apparatus, a first calculation unit configured to calculate a first shake correction amount based on an output of the shake detector, a vector detector configured to detect a motion vector on an imaging surface, a first integration unit configured to integrate an output of the vector detector, a second calculation unit configured to calculate a second shake correction amount based on the output of the vector detector, a shake correction unit configured to correct an image-shake based of the first shake correction amount and the second shake correction amount; and an angle-of-view change determination unit configured to detect an angle-of-view changing operation of the imaging apparatus, wherein the angle-of-view change determination unit determines the start of the angle-of-view changing operation when a signal obtained based on the output of the shake detector is greater than a predetermined value or an output of the first integration unit is greater than a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4A is a graph illustrating a change of an output of an angular velocity sensor from the start to the end of a panning operation, FIG. 4B is a graph illustrating a change with time of angular velocity data serving as an output of an A/D converter during the panning operation, FIG. 4C is a graph illustrating a change with time of angular displacement data serving as an output of an integrator during the panning operation, and FIG. 4D is a graph illustrating a change with time of vector integration data serving as an output of the motion vector integrator during the panning operation.

FIG. 5 is a flowchart illustrating processing performed by a pan/tilt determination unit according to a second exemplary embodiment of the present invention.

FIG. 7A is a graph illustrating a change of an output of an angular velocity sensor from the start to the end of a panning operation, FIG. 7B is a graph illustrating a change of an output (angular velocity data) of an A/D converter during the panning operation, and FIG. 7C is a graph illustrating a change of an output of the angular velocity sensor after passing through a DC cut filter 202.

DESCRIPTION OF THE EMBODIMENTS

Various exemplary embodiments, features, and aspects of the invention will be described in detail below with reference to the drawings.

Figure 1:
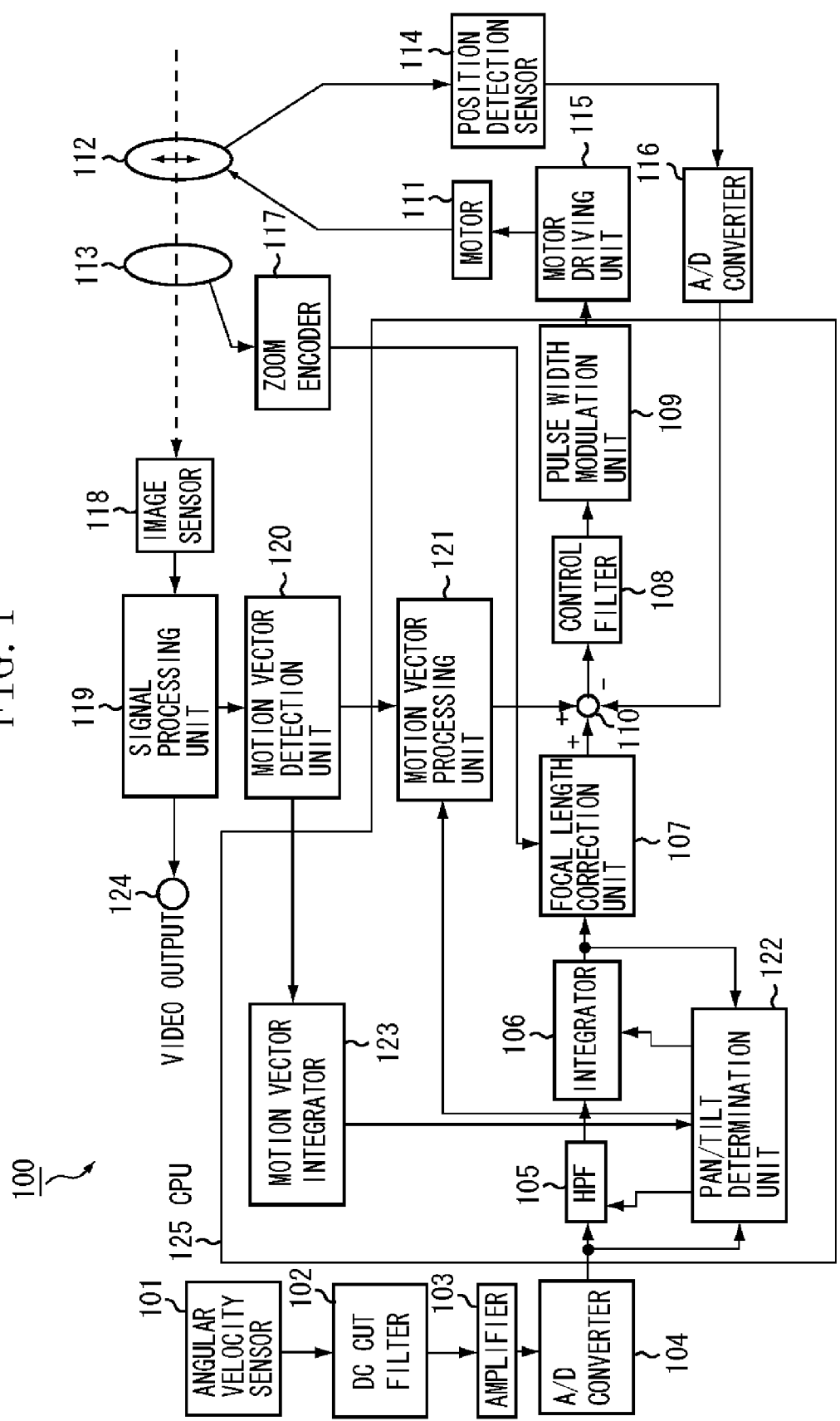
FIG. 1 is a block diagram illustrating a configuration of an example of an imaging apparatus according to an exemplary embodiment of the present invention.

FIG. 1 is a block diagram illustrating a configuration of an imaging apparatus (a video camera) according to an exemplary embodiment of the present invention. An imaging apparatus 100 illustrated in FIG. 1 differs from a conventional imaging apparatus in that a motion vector integrator 123 is provided, and a pan/tilt determination unit 122 determines panning or tilting using an output of the motion vector integrator 123, as illustrated in FIG. 1.

Each of units constituting the imaging apparatus 100 illustrated in FIG. 1 and the operation of its example will be specifically described below. An angular velocity sensor 101 detects a shake applied to the imaging apparatus 100. For example, the angular velocity sensor 101 includes an angular velocity sensor using a vibration gyro, and detects a shake applied to the imaging apparatus 100 due to a camera shake or the like as an angular velocity signal and feeds the angular velocity signal to a DC cut filter 102.

The DC cut filter 102 cuts off a DC component included in the angular velocity signal from the angular velocity sensor 101, and supplies only an AC component, i.e., a vibration component of the angular velocity signal to an amplifier 103. The DC cut filter 102 may be a high-pass filter (HPF) that cuts off an input signal in a predetermined frequency band.

The amplifier 103 amplifies the angular velocity signal (vibration component) from the DC cut filter 102 to have optimum sensitivity, and feeds the amplified angular velocity signal to an analog-to-digital (A/D) converter 104. The A/D converter 104 digitizes the angular velocity signal from the amplifier 103, and feeds the digitized angular velocity signal to a high-pass filter (HPF) 105 inside a central processing unit (CPU) 125 as angular velocity data.

The CPU 125 includes the HPF 105 that is supplied with an output of the A/D converter 104, an integrator 106 that is supplied with an output of the HPF 105, and a motion vector processing unit 121 and a motion vector integrator 123 that are supplied with an output of a motion vector detection unit 120.

The CPU 125 further includes a pan/tilt determination unit 122 that is supplied with respective outputs of the A/D converter 104, the integrator 106, and the motion vector integrator 123. The operations of the HPF 105, the integrator 106, and the motion vector processing unit 121 are changed depending on the result of the determination by the pan/tilt determination unit 122.

The HPF 105 has the function of making its properties variable in any frequency band, and cuts off a low frequency component included in the angular velocity data from the A/D converter 104 and outputs a signal in a high frequency band. The integrator 106 has a function of making its properties variable in any frequency band, and integrates the angular velocity data output from the HPF 105 and outputs the result of the integration as angular displacement data.

An imaging optical system 113 performs zooming and focusing operations, and forms an object image on an image sensor 118. A zoom encoder 117 detects a zoom position of the imaging optical system 113, and outputs the zoom position to a focal length correction unit 107 in the CPU 125. The focal length correction unit 107 calculates the focal length of the imaging optical system 113 from an output of the zoom encoder 117, and calculates a driving amount (gyro-based correction data serving as a first shake correction amount) of a correction optical system 112 based on the focal length and the output of the integrator 106.

The image sensor 118 converts the object image formed by the imaging optical system 113 into an electrical signal, and feeds the electrical signal to a signal processing unit 119. The signal processing unit 119 generates a video signal conforming to an NTSC format, for example, from the electrical signal obtained by the image sensor 118, and feeds the video signal to the motion vector detection unit 120.

The motion vector detection unit 120 detects a motion vector based on a luminance signal included in the video signal from the signal processing unit 119. Specific examples of a motion vector detecting method include a correlation method and a block matching method. The block matching method is used as an example for the motion vector detection unit 120 in the exemplary embodiment of the present invention.

The block matching method means a method for first dividing an input image signal into a plurality of blocks of suitable size (e.g., eight pixels by eight pixels), calculating respective differences between the pixels and corresponding pixels in a predetermined range of the preceding field or frame in blocks, retrieving the block in the preceding field or frame in which the sum of the absolute values of the differences is the minimum, and detecting relative displacement of the block as a motion vector of the block.

Since a matching operation in the block matching method is discussed in detail in "Journal of Information Processing Vol. 1.17, No. 7, pp. 634-640, July 1976" by Onoue Morio, et al., for example, the detailed description thereof is omitted.

Figure 2:
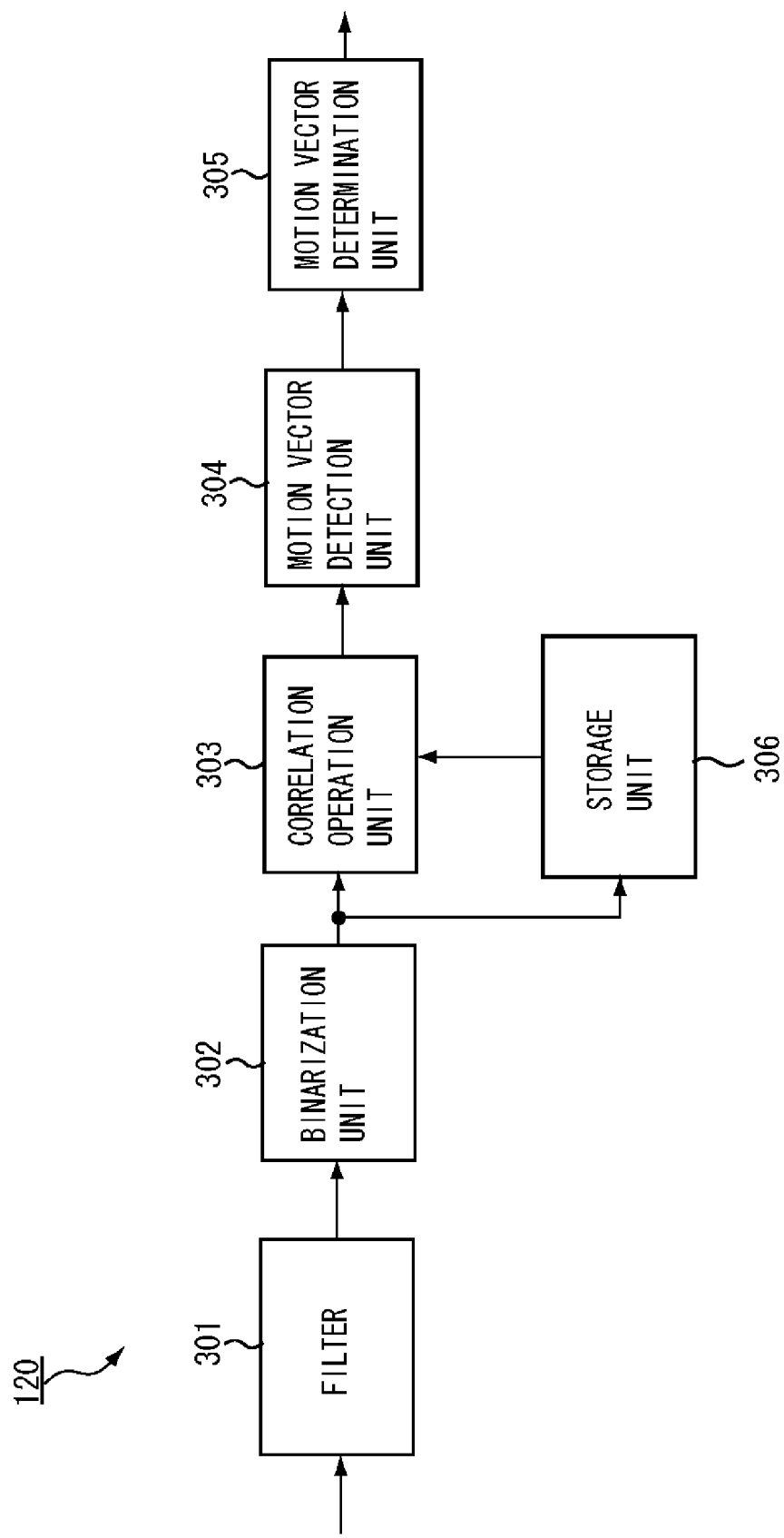
FIG. 2 is a block diagram illustrating a configuration of an example of a motion vector detection unit according to an exemplary embodiment of the present invention.

FIG. 2 illustrates an example of the configuration of the motion vector detection unit 120. A filter 301 aims at removing a high spatial frequency component of an image signal, for example, and extracts a spatial frequency component useful for detecting a motion vector from the video signal fed from the signal processing unit 119 and outputs thereof.

A binarization unit 302 binarizes the image signal output from the filter 301 with a predetermined level used as its boundary, and feeds it to each of a correlation operation unit 303 and a storage unit 306. The storage unit 306 stores the preceding sample data in the binarization unit 302, and delays the image signal from the binarization unit 302 by one field period and feeds the delayed image signal to the correlation operation unit 303.

The correlation operation unit 303 performs a correlation operation between respective outputs of the binarization unit 302 and the storage unit 306. More specifically, the correlation operation unit 303 is fed with an image signal (an image signal in the current field) from the binarization unit 302 and an image signal (an image signal in the preceding field) from the storage unit 306.

The correlation operation unit 303 performs a correlation operation between the current field and the preceding field in a block unit according to the above-mentioned block matching method, and supplies a correlated value (i.e., the result of the operation to a motion vector detection unit 304).

The motion vector detection unit 304 detects motion vectors in blocks from the correlated values from the correlation operation unit 303 respectively. More specifically, the block in the preceding field in which the correlated value is the minimum, and detects its relative displacement as a motion vector.

A motion vector determination unit 305 determines the whole motion vector from the motion vectors in blocks from the motion vector detection unit 304 respectively. For example, a central value or an average value of the motion vectors in blocks is determined as the whole motion vector. An output of the motion vector determination unit 305 is supplied to the motion vector processing unit 121 and the motion vector integrator 123 inside the CPU 125.

By the above-mentioned configuration, the motion vector detection unit 120 finds a movement amount (i.e., a motion vector) in each of a vertical direction and a horizontal direction in a pixel unit. The motion vector indicates a movement amount per unit time of a continuous picked-up image, i.e., the remaining image-shake of the picked-up image. In other words, when there is no error in gyro-based correction data serving as a correction amount on the side of the angular velocity sensor 101, a motion vector on the picked-up image is not detected.

Referring to FIG. 1 again, the motion vector processing unit 121 integrates data representing the motion vector output from the motion vector detection unit 120 using a low-pass filter (LPF), and calculates the result of the integration as data representing the displacement of the motion vector. The result of the calculation becomes a driving amount (vector-based correction data serving as a second shake correction amount) of the correction optical system 112.

The motion vector integrator 123 integrates the data representing the motion vector output from the motion vector detection unit 120, and outputs the integrated data (vector integration data) to the pan/tilt determination unit 122. Although there are various methods such as a method using the LPF and a method for adding outputs of the motion vector detection unit 120 for each unit time as a method for the integration, any one of the methods may be used.

The pan/tilt determination unit 122 determines, when a user performs a panning operation or a tilting operation for the imaging apparatus 100, for example, whether the imaging apparatus 100 is in a panning state or a tilting state. The pan/tilt determination unit 122 determines whether the imaging apparatus 100 is in a panning state or a tilting state based on the angular velocity data output from the A/D converter 104, the angular displacement data output from the integrator 106, and the vector integration data output from the motion vector integrator 123.

When the pan/tilt determination unit 122 determines that the imaging apparatus 100 is in the panning state or the tilting state, panning control is carried out. The most characteristic requirements in the imaging apparatus 100 are that the pan/tilt determination unit 122 determines whether the imaging apparatus 100 is in a panning state or a tilting state based on the vector integration data. The detailed description thereof will be made below.

An adder/subtracter 110 first adds the gyro-based correction data serving as the correction amount on the side of the angular velocity sensor 101, which is output from the focal length correction unit 107, and the correction amount on the side of the motion vector detection unit 120, which is output from the motion vector processing unit 121, to obtain final correction data. The final correction data is calculated as a driving amount of the correction optical system 112.

The adder/subtracter 110 subtracts, from the final correction data, data obtained by performing analog-to-digital conversion of an output of a position detection sensor 114 for detecting the position of the correction optical system 112 in an A/D converter 116 to digitize the output, and supplies deviation data (i.e., the result of the subtraction) to a control filter 108. The control filter 108 is composed of an amplifier for amplifying input data with a predetermined gain and a phase compensation filter.

The deviation data supplied from the adder/subtracter 110 is supplied to the control filter 108, is subjected to signal processing by the amplifier and the phase compensation filter, and is then output to a pulse width modulation unit 109. The pulse width modulation unit 109 modulates the data supplied after passing through the control filter 108 into a waveform for changing the duty ratio of a pulse wave (i.e., a pulse width modulation (PWM) waveform), and supplies the PWM waveform to a motor driving unit 115.

The motor 111 is a voice coil-type motor for driving the correction optical system 112, and is driven from the motor driving unit 115 so that the correction optical system 112 moves in a direction substantially perpendicular to an optical axis. A position detection sensor 114 is composed of a magnet and a hole sensor provided at a position opposite thereto, and detects a movement amount, in the direction substantially perpendicular to the optical axis, of the correction optical system 112 and supplies the result of the detection to the adder/subtracter 110 via the A/D converter 116.

This constitutes a feedback control system that causes the movement amount in the direction perpendicular to the optical axis of the correction optical system 112 to follow the above-mentioned final correction data.

The correction optical system 112 is a shift lens, for example, and is a correction system, capable of optically correcting a shake, which is moved in the direction substantially perpendicular to the optical axis to deflect the direction of the optical axis. As a result, an image of an object whose movement on an imaging surface caused by a shake applied to the imaging apparatus 100 is corrected is formed on the image sensor 118 via the imaging optical system 113.

An output of the image sensor 118 is subjected to predetermined signal processing in the signal processing unit 119, and is supplied to a recording device and a display device via a video output terminal 124 while being supplied to the motion vector detection unit 120.

A first method for processing performed by the pan/tilt determination unit 122 in the imaging apparatus 100 illustrated in FIG. 1 as an example of the present exemplary embodiment will be described in detail with reference to the drawings.

Figure 3:
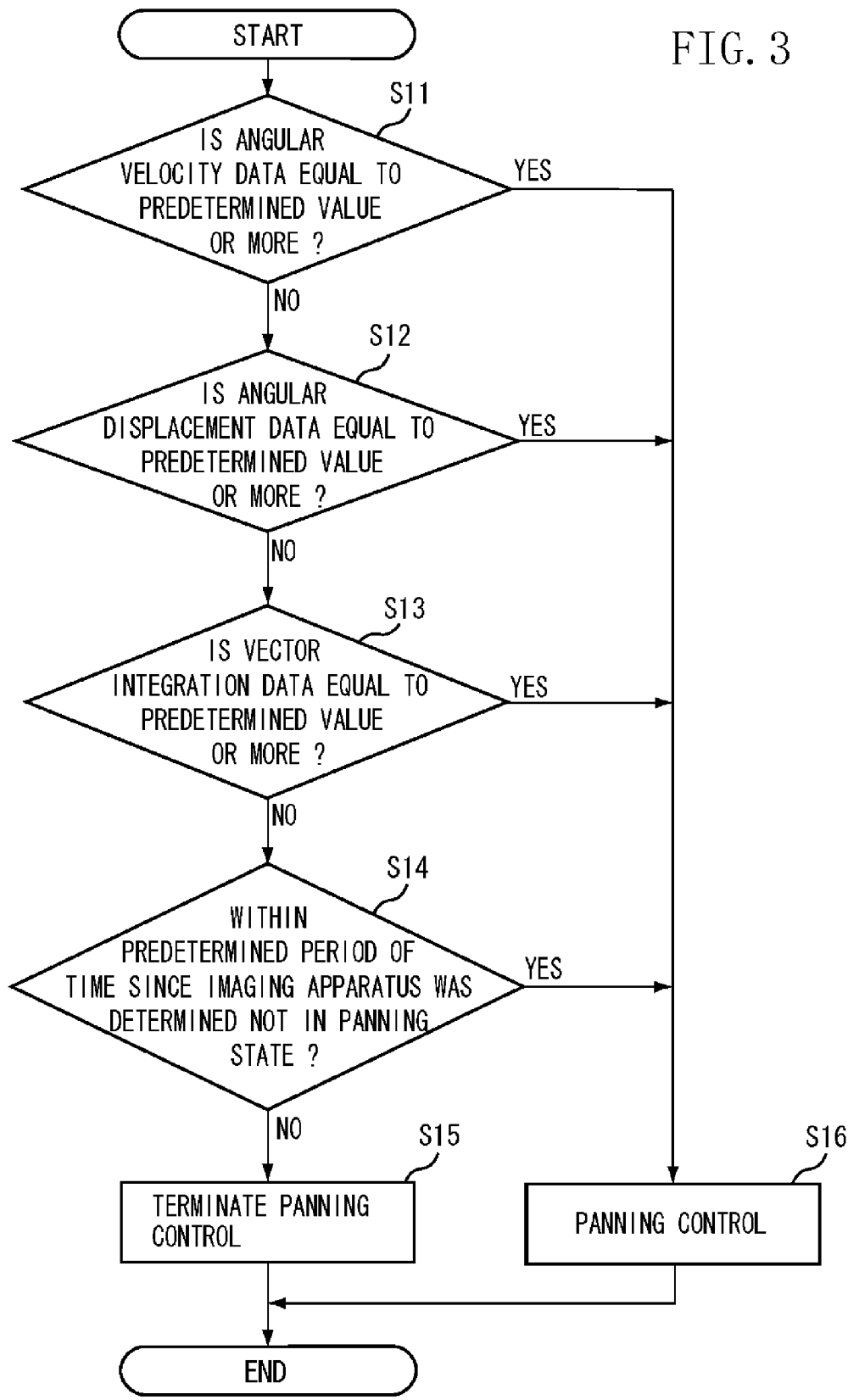
FIG. 3 is a flowchart illustrating processing performed by a pan/tilt determination unit according to a first exemplary embodiment of the present invention.
Figure 6:
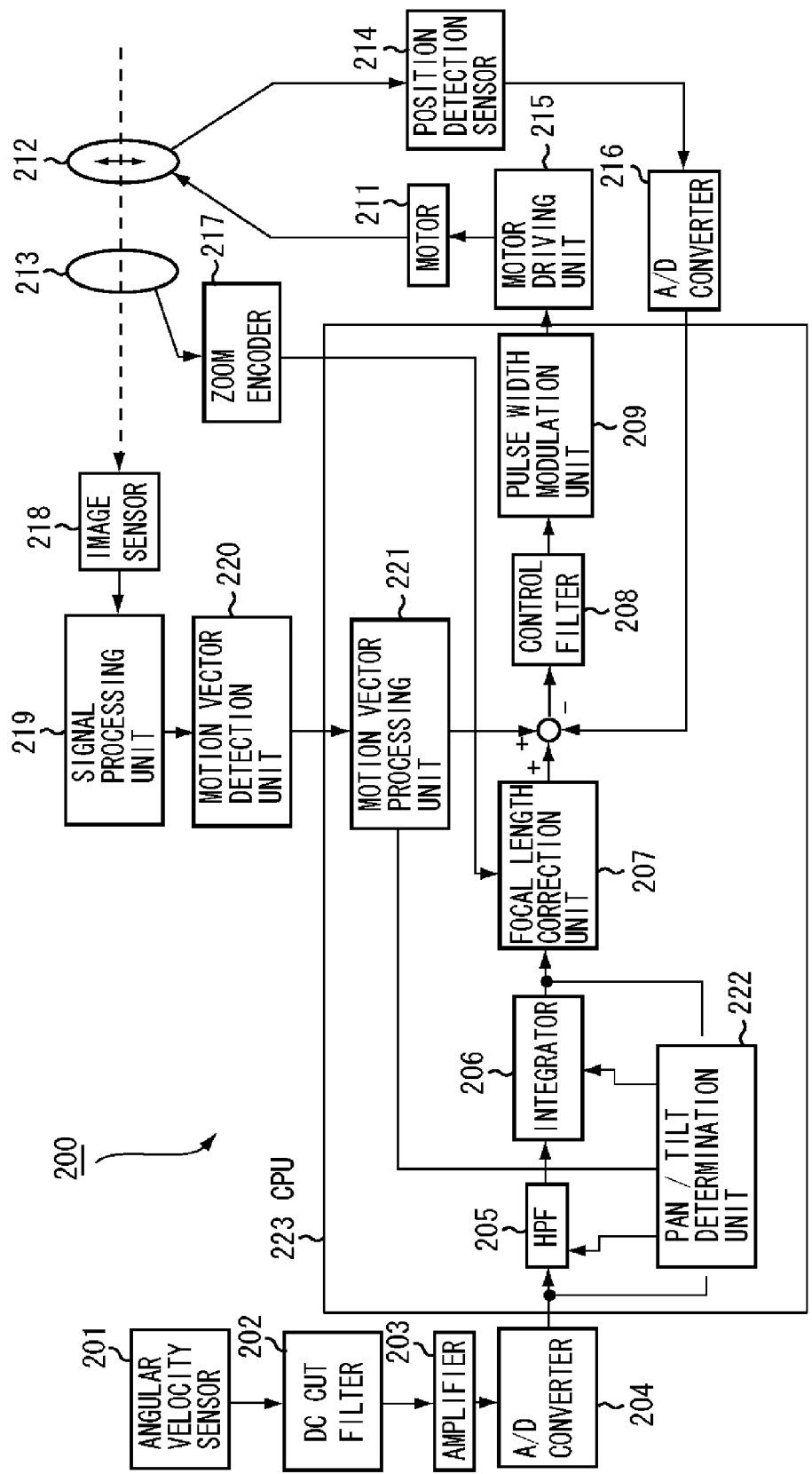
FIG. 6 is a block diagram illustrating a configuration of an example of a conventional imaging apparatus having a shake correction function.

FIG. 3 is a flow chart illustrating processing performed by the pan/tilt determination unit 122. In step S11, the pan/tilt determination unit 122 determines whether angular velocity data output from the A/D converter 104 is equal to a predetermined threshold value or more. If the angular velocity data is not equal to the predetermined threshold value or more (NO in step S11), the processing proceeds to step S12.

In step S12, the pan/tilt determination unit 122 determines whether angular displacement data output from the integrator 106 is equal to a predetermined threshold value or more. If the angular displacement data is not equal to the predetermined threshold value or more (NO in step S12), the processing proceeds to step S13.

In step S13, the pan/tilt determination unit 122 determines whether vector integration data output from the motion vector integrator 123 is equal to a predetermined threshold value or more. If the vector integration data is not equal to the predetermined threshold value or more (NO in step S13), the processing proceeds to step S14.

When determining that the data is equal to the predetermined threshold value or more in any one of steps S11, S12, and S13, it is determined that the imaging apparatus 100 according to the present exemplary embodiment is in the panning state or the tilting state. When determining that the data are respectively less than the threshold values in all steps S11, S12, and S13, it is determined that the imaging apparatus 100 according to the present exemplary embodiment is not in the panning state or the tilting state.

In step S14, after determining that the imaging apparatus 100 in the present exemplary embodiment is in the panning state or the tilting state, the pan/tilt determination unit 122 determines whether a predetermined period of time has not elapsed since the imaging apparatus 100 was determined not to be in the panning state or the tilting state. The predetermined period of time means a period of time elapsed since the imaging apparatus 100 was determined not to be in a panning state or a tilting state, for example, T_stable illustrated in FIG. 4D. If it is determined that the predetermined period of time or more has elapsed (NO in step S14), the processing proceeds to step S15.

If the angular velocity data is equal to the predetermined threshold value or more (YES in step S11), if the angular displacement data is equal to the predetermined threshold value or more (YES in step S12), or if the vector integration data is equal to the predetermined threshold value or more (YES in step S13), the processing proceeds to step S16. Alternatively, even when the data are respectively below the predetermined threshold values (NO in steps S11 to S13), if the predetermined period of time has not elapsed since the imaging apparatus 100 was determined not to be in the panning state or the tilting state (YES in step S14), the processing proceeds to step S16.

The processing in step S16 is processing during the panning control. In step S16, the pan/tilt determination unit 122 sets a cutoff frequency used for an operation in the HPF 105 higher (to the higher frequency side) than a cutoff frequency before the panning control, and makes the attenuation factor of a low frequency signal greater than that before the panning control.

The pan/tilt determination unit 122 makes a time constant used for an operation in the integrator 106 shorter than a time constant before the panning control so that the angular displacement data comes closer to a reference value. Further, the pan/tilt determination unit 122 substitutes zero for a signal output from the motion vector detection unit 120 to the motion vector processing unit 121, to stop shake correction based on vector-based correction data. Alternatively, processing for making an input to the motion vector processing unit 121 zero may be performed by a method for reducing and limiting the gain of the motion vector processing unit 121.

This enables angular velocity data and vector data in a low frequency band serving as a main component of a panning operation to be excluded from the final correction data, which can prevent the panning operation by the user from being corrected as a shake. After step S16, the current processing ends.

On the other hand, the processing in step S15 is performed when the predetermined period of time or more has elapsed since all the angular velocity data, the angular displacement data, and the vector integration data were respectively below the threshold values as a result of the determinations in steps S11, S12, and S13. More specifically, the processing in step S15 is performed when the predetermined period of time or more has elapsed since the imaging apparatus 100 was determined not to be in the panning state or the tilting state.

In step S15, the pan/tilt determination unit 122 sets the cutoff frequency used for the operation in the HPF 105 low (to the low frequency side), makes the attenuation factor of the low frequency signal small, sets the time constant used for the operation in the integrator 106 long, to increase the integration effect, and further allows input of a signal from the motion vector detection unit 120 to the motion vector processing unit 121, to make shake correction based on the vector-based correction data. Thus, the panning control ends.

After an elapse of the predetermined period of time since the imaging apparatus 100 was determined not to be in the panning state or the tilting state by the processing in step S15, shake correction is performed up to the low frequency band. Therefore, good shake correction performance can be achieved in the whole frequency band. After step S15, the current processing ends.

The processing in step S11 and the subsequent steps illustrated in FIG. 3 are repeatedly performed at predetermined timing, for example, for each field (for 60 Hz in an NTSC system).

The effectiveness of the determination whether the imaging apparatus 100 in the present exemplary embodiment is in the panning state or the tilting state using the vector integration data serving as the output of the motion vector integrator 123 will be then described with reference to FIG. 4.

FIGS. 4A, 4B, 4C, and 4D respectively illustrate the states of signals that have been processed as illustrated in the flowchart of FIG. 3 when a similar panning operation to that illustrated in FIGS. 7A, 7B, and 7C is performed in the imaging apparatus 100 in the present exemplary embodiment.

FIG. 4A is a graph illustrating a change of the output of the angular velocity sensor 101 from the start to the end of the panning operation. More specifically, FIG. 4A is a graph illustrating a change with time of the output of the angular velocity sensor 101 at the time that the panning operation is gradually accelerated from time T1 to time T2, is performed at a predetermined speed from time T2 to time T4, and is gradually decelerated from time T4 to time T5, to end.

FIG. 4B is a graph illustrating a change with time of the angular velocity data (i.e., the output of the A/D converter 104) during the panning operation. FIG. 4C is a graph illustrating a change with time of the angular displacement data (i.e., the output of the integrator 106) during the panning operation. FIG. 4D is a graph illustrating a change with time of the vector integration data (i.e., the output of the motion vector integrator 123) during the panning operation.

The change of the angular velocity data (i.e., the output of the A/D converter 104) illustrated in FIG. 4B is a change of the output of the angular velocity sensor 101 after passing through the DC cut filter 102, so that a DC component of the angular velocity data is attenuated from time T2 to time T4.

A threshold value at which the transition to panning control for the angular velocity data occurs in step S11 illustrated in FIG. 3 is set to Pan_th1, as illustrated in the graph of FIG. 4B. When the angular velocity data exceeds Pan_th1 from time T2 to time T3, the panning control is started.

However, since the output of the angular velocity sensor 101 passes through the DC cut filter 102, the DC component of the angular velocity data is attenuated. Because of its effect, it is not determined that the imaging apparatus 100 is in the panning state or the tilting state even if the panning operation is being performed from time T3 to time T4.

A threshold value at which the transition to panning control for the angular displacement data occurs in step S12 illustrated in FIG. 3 is set to Pan_th2, as illustrated in the graph of FIG. 7C. When the angular displacement data exceeds Pan_th2 from time T2 to time T3, it is determined that the panning operation (angle-of-view changing operation) is started, and the panning control is started When the panning control is started, the low cutoff frequency of the HPF 105 is shifted to the higher frequency side, and the time constant used for the integration operation in the integrator 106 is shifted in a direction to decrease the value thereof. Even if the angular velocity data is greatly shifted toward the plus side from time T2 to time T3 illustrated in FIG. 4B, therefore, the angular displacement data is restrained from increasing, to gradually come closer to the reference value.

In the present exemplary embodiment, the reference value means a value that the angular displacement data can take with no shake applied to the imaging apparatus 100. As a result, the angular displacement data gradually comes closer to the reference value from time T3 to time T3'. The angular displacement data is below Pan_th2, so that it is determined that the panning operation (angle-of-view changing operation) is terminated. Even during the panning operation, therefore, it is not determined that the imaging apparatus 100 is in the panning state or the tilting state.

In the imaging apparatus 100 in the exemplary embodiment of the present invention, the vector integration data is further used for determining that the imaging apparatus 100 is in the panning state or the tilting state. FIG. 4D is the graph illustrating the change of the vector integration data during the panning operation, as described above. From time T2 to time T3, the angular velocity data exceeds Pan_th1, and the angular displacement data exceeds Pan_th2, so that the panning control is started.

At this time, the low cutoff frequency of the HPF 105 is shifted to the higher frequency side, and the time constant used for the integration operation in the integrator 106 is shifted in a direction to decrease the value thereof, as described above. Therefore, the attenuation factor of the low frequency signal increases, so that the angular displacement data comes closer to the reference value. As a result, the remaining image-shake in the low frequency band increases, and the vector integration data (i.e., the outputs of the motion vector detection unit 120) and the motion vector integrator 123 also increases.

Therefore, in the imaging apparatus 100 according to the exemplary embodiment of the present invention, a threshold value at which the transition to the panning control for the vector integration data in step S13 illustrated in FIG. 3 is set to Pan_th3, as illustrated in the graph of FIG. 4D. From time T2 to time T3, the vector integration data exceeds Pan_th3. After that, in a period elapsed until the panning operation is terminated from time T4 to time T5, an image formed by the image sensor 118 continues to move.

Therefore, the vector integration data is always above Pan_th3, so that it is determined that the imaging apparatus 100 is in the panning state or the tilting state. Thus, from time T3 to time T3', the panning control can be also kept. The angular displacement data comes closer to the reference value, as illustrated in FIG. 4C.

From time T4 to time T5, the angular velocity data varies in the minus direction caused by the output of the angular velocity sensor 101 at the time that the panning operation is decelerated. A predetermined period of time in step S14 illustrated in FIG. 3 is set to T_stable, to cover a period during which the angular velocity data illustrated in FIG. 4B varies in the minus direction, as illustrated in FIG. 4D, and not to cancel the panning control in this period.

This enables a low frequency signal component at the time when the angular velocity data varies in the minus direction to be attenuated, which can restrain the angular displacement data from varying, as illustrated in FIG. 4C.

It is thus determined that the panning operation is being performed in the period elapsed until the panning operation is terminated from time T4 to time T5. Therefore, it can be correctly determined that the panning operation is terminated. The variation in the angular displacement data due to the variation in the angular velocity data can be inhibited from occurring in the period from time T4 to time T6 during which the panning operation is terminated.

A second method for processing performed by the pan/tilt determination unit 122 in the imaging apparatus 100 illustrated in FIG. 1 as an example of the present exemplary embodiment will be described in detail with reference to the drawings.

FIG. 5 is a flowchart illustrating the flow of the processing performed by the pan/tilt determination unit 122. In step S21, the pan/tilt determination unit 122 determines whether the imaging apparatus 100 is currently carrying out panning control.

If it is determined that the panning control is not currently being carried out (NO in step S21), the processing proceeds to step S22. In step S22, the pan/tilt determination unit 122 determines whether angular velocity data output from the A/D converter 104 is equal to a predetermined threshold value or more. If the angular velocity data is not equal to the predetermined threshold value or more (NO in step S22), the processing proceeds to step S23. In step S23, the pan/tilt determination unit 122 determines whether angular displacement data output from the integrator 106 is equal to a predetermined threshold value or more. If the angular displacement data is not equal to the predetermined threshold value or more (NO in step S22), the processing proceeds to step S26.

If the angular velocity data is equal to the predetermined threshold value or more (YES in step S22), or If the angular displacement data is equal to the predetermined threshold value or more (YES in step S23), the processing proceeds to step S27.

If it is determined that the panning control is currently being carried out (YES in step S21), the processing proceeds to step S24. In step S24, the pan/tilt determination unit 122 determines whether vector integration data output from the motion vector integrator 123 is equal to a predetermined threshold value or more. If the vector integration data is not equal to the predetermined threshold value or more (NO in step S24), the processing proceeds to step S25.

In step S25, the pan/tilt determination unit 122 determines whether a predetermined period of time has not elapsed since the vector integration data was not equal to the predetermined threshold value or more in the processing illustrated in step S24, i.e., the imaging apparatus 100 was determined not to be in a panning state or a tilting state. If it is determined that the predetermined period of time or more has elapsed (No in step S25), the processing proceeds to step S26. The predetermined period of time means a period of time elapsed since the imaging apparatus 100 was determined not to be a panning state or a tilting state, for example, T_stable illustrated in FIG. 4D.

If the vector integration data is equal to the predetermined threshold value or more (YES in step S24), or if the predetermined threshold value has not elapsed (YES in step S25), the pan/tilt determination unit 222 determines that panning control is being carried out. The processing then proceeds to step S27.

In step S27, the pan/tilt determination unit 122 makes a cutoff frequency used for an operation in the HPF 105 higher than that before the panning control by a predetermined value, makes the attenuation factor of a low frequency signal greater than that before the panning control, and makes a time constant used for an operation in the integrator 106 shorter than that before the panning control by a predetermined value, to bring the angular displacement data closer to a reference value.

Furthermore, the pan/tilt determination unit 122 substitutes zero for a signal fed from the motion vector detection unit 120 to the motion vector processing unit 121, to stop shake correction based on vector-based correction data. Alternatively, processing for making an input to the motion vector processing unit 121 zero may be performed by a method for reducing and limiting the gain of the motion vector processing unit 121. After step S27, the current processing ends.

By the processing in step S27, the shake correction based on the vector-based correction data performing the function of increasing the attenuation factor of a low frequency signal of gyro-based correction data and correcting the remaining image-shake in a low frequency band is stopped during the panning control. This enables angular velocity data and vector data in a low frequency band serving as a main component of a panning operation to be excluded from a correction object.

On the other hand, the processing in step S26 is performed when the predetermined period of time or more has elapsed since the vector integration data was below the threshold value and the imaging apparatus 100 was determined not to be in the panning state or the tilting state as a result of the determinations in step S24 and step S25.

In step S26, the pan/tilt determination unit 122 sets the cutoff frequency used for the operation in the HPF 105 low, makes the attenuation factor of the low frequency signal small, sets the time constant used for the operation in the integrator 106 long, to increase the integration effect, and further allows input of a signal from the motion vector detection unit 120 to the motion vector processing unit 121, to make shake correction based on the vector-based correction data. Thus, the panning control ends.

After an elapse of the predetermined period of time since the imaging apparatus 100 was determined not to be in the panning state or the tilting state during the panning control by the processing in step S26, shake correction is performed up to the low frequency band. Therefore, good shake correction performance can be achieved in the whole frequency band. After step S26, the current processing ends.

The processing in step S21 and the subsequent steps illustrated in FIG. 5 are repeatedly performed at predetermined timing, for example, for each field (for 60 Hz in an NTSC system).

The difference between respective methods for determining whether the imaging apparatus 100 is in a panning state or a tilting state in FIGS. 3 and 5 will be described. In the processing illustrated in FIG. 3, the transition to the panning state or the tilting state and the termination thereof are determined using all the angular velocity data, the angular displacement data, and the vector integration data.

On the other hand, in the processing illustrated in FIG. 5, the transition to the panning state or the tilting state is determined using the angular velocity data and the angular displacement data, and the termination of the panning state or the tilting state is determined using the vector integration data.

Even if the method for determining whether the imaging apparatus 100 is in the panning state or the tilting state based on the flowchart of FIG. 5 is used, changes with time of the angular velocity data, the angular displacement data, and the vector integration data during the panning operation have similar waveforms to those illustrated in FIGS. 4B to 4D. Accordingly, a similar effect as that in the method for determining whether the imaging apparatus 100 is in the panning state or the tilting state based on the flowchart of FIG. 3 can be obtained.

As described above, in the determination whether the imaging apparatus is in the panning state or the tilting state, which is performed in shake correction control, data obtained by processing an output of the vector detection unit 120 is used together with data obtained by processing an output of the angular velocity sensor 101. This enables a period from the start to the end of the panning state or the tilting state to be more accurately determined.

The operations during the panning control in step S16 and step S27 are illustrative only and are not limited to the same. For example, a method for independently performing processing for making the cutoff frequency used for the operation in the HPF 105 high and processing for making the time constant used for the operation in the integrator 106 short may be used. Alternatively, processing for making an input to the motion vector processing unit 121 zero may be performed by a method for reducing the gain of the motion vector processing unit 121.

Although the correction optical system 112 (e.g., a shift lens) has been described as an example of means for making shake correction, the present invention is not limited to the same. For example, a method for driving a variable angle prism (VAP) or an image sensor in a direction perpendicular to an optical axis may be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
   a shake detector configured to detect a shake of the imaging apparatus;
   a first calculation unit configured to calculate a first shake correction amount based on an output of the shake detector;
   a vector detector configured to detect a motion vector on an imaging surface;
   a first integration unit configured to integrate an output of the vector detector;
   a second calculation unit configured to calculate a second shake correction amount based on the output of the vector detector;
   a shake correction unit configured to correct an image-shake based of the first shake correction amount and the second shake correction amount; and
   a determination unit configured to determine whether the imaging apparatus is in a panning state;
   wherein the determination unit determines that the imaging apparatus is in a panning state in a case where at least one of the outputs, including the output of the shake detector and the output of the first integration unit, exceeds a predetermined value, and
   wherein the determination unit determines that the imaging apparatus is no longer in a panning state in a case where the output of the shake detector and the output of the first integration unit are below the predetermined value.

2. The imaging apparatus according to claim 1, wherein the determination unit further determines whether it is within a predetermined amount of time from a timing when it is determined that the imaging apparatus is no longer in a panning state, and in a case where it is within the predetermined amount of time, the determination unit determines that the imaging apparatus is in a panning state regardless of the determination of the determination unit.

3. The imaging apparatus according to claim 1, wherein the first calculation unit further comprising:
   (a) a filter unit having a variable cutoff frequency configured to limit a frequency band of the output of the shake detector;
   (b) a second integration unit having a variable time constant configured to integrate an output of the shake detector; and
   (c) a controller configured to perform at least one of following controlling operations in a case where it is determined that the imaging apparatus is in a panning state,
      (1) increasing the cutoff frequency of the filter unit when a signal obtained based on the output of the shake detector exceeds a predetermined value,
      (2) decreasing the cutoff frequency of the filter unit when a signal obtained based on the output of the first integration unit is below a predetermined value,
      (3) limiting the image-shake correction based on the second shake correction amount.

4. The imaging apparatus according to claim 3, wherein the limitation of the image-shake correction based on the second shake correction amount is to prohibit or null the entry to the second calculation unit.

5. The imaging apparatus according to claim 3, wherein, in a case where it is determined that an output from the first integration unit is below the predetermined value after being determined that the imaging apparatus is in a panning state, the controller performs at least one of following controlling operations,
   (1) increasing the cutoff frequency of the filter unit when a signal obtained based on the output of the shake detector exceeds a predetermined value,
   (2) decreasing the cutoff frequency of the filter unit when a signal obtained based on the output of the first integration unit is below a predetermined value,
   (3) limiting the image-shake correction based on the second shake correction amount.

6. A method for controlling an imaging apparatus, the method comprising:
   receiving an output from a shake detector;
   calculating a first shake correction amount based on the received output from the shake detector;
   obtaining a motion vector from a correlation of image frames which are sequentially captured by the imaging apparatus;
   integrating the motion vector;
   calculating a second shake correction amount based on the motion vector;
   correcting an image-shake based of the first shake correction amount and the second shake correction amount; and
   determining whether the imaging apparatus is in a panning state;
   wherein, in a case where at least one of the received outputs from the shake detector exceeds a predetermined value and the output of the integrated vector exceeds a predetermined value, it is determined that the imaging apparatus is in a panning state, and
   wherein, in a case where the received outputs from the shake detector are below the predetermined value and the output of the integrated vector is below the predetermined value, it is determined that the imaging apparatus is no longer in a panning state.

* * * * *